United States Patent [19]

Loizeau

[11] Patent Number: 4,488,629
[45] Date of Patent: Dec. 18, 1984

[54] TORSIONAL DAMPERS

[75] Inventor: Pierre Loizeau, Ville d'Avray, France

[73] Assignee: Valeo, Paris, France

[21] Appl. No.: 343,581

[22] Filed: Jan. 28, 1982

[30] Foreign Application Priority Data

Feb. 4, 1981 [FR] France .................... 81 02112

[51] Int. Cl.³ .......................... F16D 3/12; F16D 3/14
[52] U.S. Cl. .................................... 192/106.1; 464/82
[58] Field of Search .............. 192/106.1, 106.2, 70.17, 192/55; 464/81, 82, 100, 101

[56] References Cited

U.S. PATENT DOCUMENTS

| | | | |
|---|---|---|---|
| 1,642,475 | 9/1927 | Wood | 192/55 X |
| 1,805,357 | 5/1931 | Breer | |
| 1,962,993 | 6/1934 | Leece | 464/82 |
| 1,967,052 | 7/1934 | Dumm | 192/106.1 X |
| 1,975,772 | 10/1934 | Davis | 192/106.1 |
| 2,114,247 | 4/1938 | Davis | 192/106.1 |
| 2,141,014 | 12/1938 | Nutt | 192/106.1 |
| 2,216,703 | 10/1940 | Ericson | 464/81 X |
| 2,281,898 | 5/1942 | Whitten | 192/106.1 |
| 2,597,380 | 5/1952 | Root | 192/106.1 X |
| 2,826,902 | 3/1958 | DeCoursey | 192/106.2 X |
| 2,837,902 | 6/1958 | Stevens et al. | 464/101 |
| 4,105,102 | 8/1978 | Nels | 192/106.1 |
| 4,210,234 | 7/1980 | Jones | 192/106.1 |
| 4,300,363 | 11/1981 | Mathues | 192/55 X |

FOREIGN PATENT DOCUMENTS 1454232 8/1966 France .
2411999 7/1979 France .

Primary Examiner—Rodney H. Bonck
Attorney, Agent, or Firm—Charles E. Brown

[57] ABSTRACT

A torsional damper suitable for use in a friction clutch plate for an automotive vehicle comprises at least two coaxial parts mounted to rotate relative to one another, within a defined range of relative angular movement. Friction means operative between the rotating parts comprise two friction pads constrained to rotate with one part, in rubbing engagement with an axial surface constrained to rotate with the other part. This surface is non-circular in transverse cross-section. Its radius of curvature varies between at least one minimum and at least one maximum. Thus it may be generally oval in shape, for example.

21 Claims, 6 Drawing Figures

TORSIONAL DAMPERS

BACKGROUND OF THE INVENTION

1. Field of the Invention

The present invention concerns a torsional damper comprising at least two coaxial parts mounted to rotate relative to one another within a defined range of relative angular movement and circumferentially acting elastic means between said parts resisting such relative angular movement.

2. Description of the Prior Art

This type of torsional damper is normally incorporated in the design of a friction clutch plate, particularly for automotive vehicles, in which case one rotating part comprises a friction disk designed to rotate with a first shaft, in practice a driving shaft and the motor output shaft in the case of an automotive vehicle, whereas the other of said rotating parts is carried on a hub designed to rotate with a second shaft, in practice a driven shaft and the gearbox input shaft in the case of an automotive vehicle.

This type of device is used to permit regulated transmission of rotational torque applied to one of its rotating parts where the other is itself subject to a rotational torque. It is thereby able to filter vibrations which may arise at any point in the kinematic system in which it is incorporated, extending from the motor to the driven road wheels in the case of an automotive vehicle.

In practice, this type of torsional damper further comprises friction means operative between its constituent rotating parts and generating a friction torque between them, in one direction or the other. This produces a "hysteresis" effect, that is to say a difference, for the same value of relative angular movement between the rotating parts, between the value of the torque transmitted from one rotating part to the other for one sense of change in the torque and the value of this torque for the opposite sense of change thereof, favouring the filter action required.

These friction means usually comprise one or more friction rings acting axially between the rotating parts concerned.

It has been proposed, however, in particular in U.S. Pat. No. 2,826,902, to substitute for such friction rings at least one friction pad which is constrained to rotate with one of the rotating parts concerned and is in rubbing engagement with an axial surface constrained to rotate with the other rotating part, thus acting radially between the rotating parts.

One advantage of this type of friction pad is that it is responsive to centrifugal force, so that its effect increases as the rotational speed of the damper assembly increases. In some applications at least, this is favourable to the filtering of vibration producing noise.

Another advantage is that it is a simple matter to combine such a friction pad with elastic means of relatively low stiffness acting between the rotating parts concerned over a relatively extended range of relative angular movement therebetween, also favouring the required filter action.

In the aforementioned U.S. Pat. No. 2,826,902, the friction pads are in rubbing engagement with an axial surface which is circular in transverse cross-section.

While this arrangement can give satisfactory results, at least in certain applications, it has the disadvantage that the hysteresis effect due to the friction pads is independent of the degree of relative angular movement between the rotating parts concerned.

The general object of the present invention is to provide an arrangement which, using friction pads of this type, provides a hysteresis effect which varies with the degree of relative angular movement between the rotating parts concerned, permitting an extension to the field of application of such friction pads.

SUMMARY OF THE INVENTION

The present invention consists in a torsional damper suitable for use in a friction clutch plate for an automotive vehicle, comprising at least two coaxial parts mounted to rotate relative to one another within a defined range of relative angular movement, elastic means disposed circumferentially between said parts, and friction means operative between said parts and comprising at least one friction pad which is constrained to rotate with one of said parts and is in rubbing engagement with an axial surface constrained to rotate with the other of said parts, said axial surface being non-circular in transverse cross-section.

In this way the effects of the friction pad may be modulated as a function of the relative angular movement between the rotating parts concerned, as appropriate to the application in question.

All that is necessary is to shape as appropriate the axial surface with which the friction pad cooperates.

For example, in one embodiment said axial surface is curved in transverse cross-section, its radius of curvature varying between a minimum and a maximum, and, in the rest configuration of the damper, the friction pad is in line with a portion of said axial surface with a minimum radius of curvature.

In this case, the hysteresis effect due to the friction pads may be nil in the rest configuration of the damper assembly, with zero relative angular movement between the rotating parts concerned, and increase regularly as the degree of relative angular movement increases, so improving the filtering of certain vibrations.

Any other modulation of the hysteresis effect may be envisaged, however.

Other objects and advantages will appear from the following description of examples of the invention, when considered in connection with the accompanying drawings, and the novel features will be particularly pointed out in the appended claims.

DESCRIPTION OF THE PREFERRED EMBODIMENTS

Figure 1:
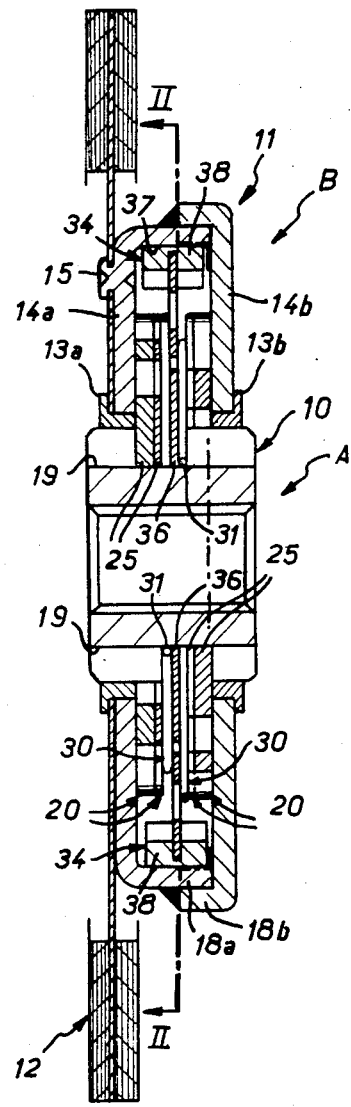
FIG. 1 is an axial cross-section through a torsional damper in accordance with the invention on the line I—I in FIG. 2.
Figures 3, 4:
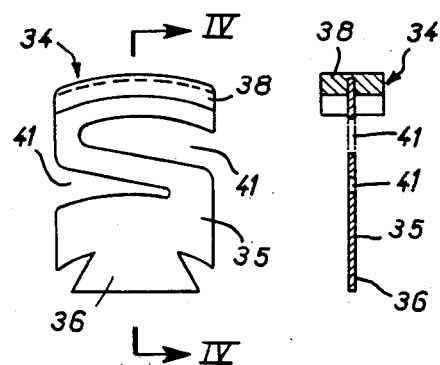
FIG. 3 is a view in elevation of one of the friction pads used in the torsional damper, shown separately.
FIG. 4 is an axial cross-section through the aforementioned friction pad on the line IV—IV in FIG. 3.

The drawings illustrate, by way of example, the application of the invention to the construction of a friction clutch plate for automotive vehicles, incorporating a damping hub.

In the embodiment shown, the friction clutch comprises two coaxial parts A and B mounted to rotate relative to one another within a defined range of relative angular movement, and circumferentially acting elastic means between them resisting such relative angular movement.

In the embodiment shown, rotating part A comprises a hub 10 which is, for example and as shown, internally splined so that it may be constrained to rotate with a shaft, in practice a driven shaft.

In the embodiment shown, rotating part B comprises an annular casing 11 disposed around hub 10, with interposed bearings 13a, 13b, and supporting a friction disk 12.

For example, and as shown, casing 11 is formed by two complementary annular shells 14a, 14b, which have overlapping peripheral flanges 18a, 18b respectively, and which are attached together by welding along these peripheral flanges 18a, 18b.

The innermost shell 14a supports friction disk 12, which may be riveted thereto by means of integral rivets 15, as shown.

In a manner which is known per se, rotating part B is designed to be engaged with a first shaft, in practice a driving shaft, so as to rotate therewith, by clamping friction disk 12 between two plates rotating with the aforementioned shaft (not shown in the drawings).

In the embodiment shown, the circumferentially acting elastic means disposed between rotating parts A and B comprise an axial stack of modular flanges 20, each constrained to rotate with hub 10 of rotating part A by a radial foot 25.

In the embodiment shown, hub 10 is formed to this end with two grooves 19 at diametrically opposed positions, each of which is trapezoidal in transverse cross-section, and foot 25 of each modular flange 20 has a corresponding trapezoidal profile, to provide a dovetail type engagement facility with hub 10.

In practice, in the embodiment shown, two modular flanges 20 are engaged in each groove 19 in hub 10, of identical shapes and differing only in terms of their thickness in the axial direction.

The modular flanges 20 in each groove 19 in hub 10 are identical to those in the other groove.

Each modular flange 20 comprises two elastically deformable arms 22, 22', each integral at one end with a common support 23, in practice an annular member from whose internal perimeter the corresponding foot 25 extends radially, each arm extending from support 23 in a substantially circumferential direction, over slightly less than 180°, the two arms extending in opposite directions.

At their ends, elastically deformable arms 22, 22' have respective shoulders 27, 27' by means of which they can engage with respective edges 26, 26' of tangs 17, 17' formed by bending inwards peripheral flange 18 of shell 14a of casing 11.

Two pairs of tangs 17, 17' are provided, in diametrically opposed positions. In each pair of tangs 17, 17', tang 17 extends obliquely and circumferentially in a first direction while tang 17' associated therewith extend circumferentially and obliquely in the opposite direction.

Tangs 17 are designed to be effective for a first direction of rotation of the assembly, shown by the arrow F, being the direction in which they extend. Tangs 17' are designed to be effective for the opposite direction of rotation, again that in which they extend, as will emerge more clearly later.

In the embodiment shown, the circumferentially acting elastic means disposed between rotating part A and rotating part B further comprise two springs 30.

Each spring 30 has one end shaped to form a foot 31 complementary with axial grooves 19 in hub 10, so as to be freely engaged in the axial direction in one of these grooves, like the stack of modular flanges 20. The other end is shaped to form a hook 32, the portion of the spring between these shaped ends extending circumferentially.

Arranged so that they are diametrically opposed to one another, springs 30, like modular flanges 20, have their foot 31 engaged in a respective one of the axial slots 19 in hub 10. By their respective hooked ends 32, one is coupled to tang 17 of shell 14a of casing 11 (that furthest in the circumferential direction from axial slot 19 in hub 10 in which its foot 31 is engaged) and the other is coupled to the corresponding tang 17' of shell 14a, the two springs extending circumferentially in opposite directions.

As the arrangements constituting the circumferentially elastic means disposed between rotating parts A and B in the embodiment shown do not constitute part of the present invention, they will not be described in greater detail here.

Also operative between rotating parts A and B are friction means which, in the embodiment shown, comprise two friction pads 34 which rotate with one rotating part and provide rubbing engagement with an axial surface rotating with the other rotating part.

In the embodiment shown, the two friction pads 34 are disposed in diametrically opposite positions, and are attached to hub 10 of rotating part A. The axial surface with which they cooperate is constrained to rotate with rotating part B.

In accordance with the invention, this axial surface, which is formed by the internal surface 37 of peripheral flange 18a of shell 14a of casing 11, is non-circular in transverse cross-section.

Figure 2:
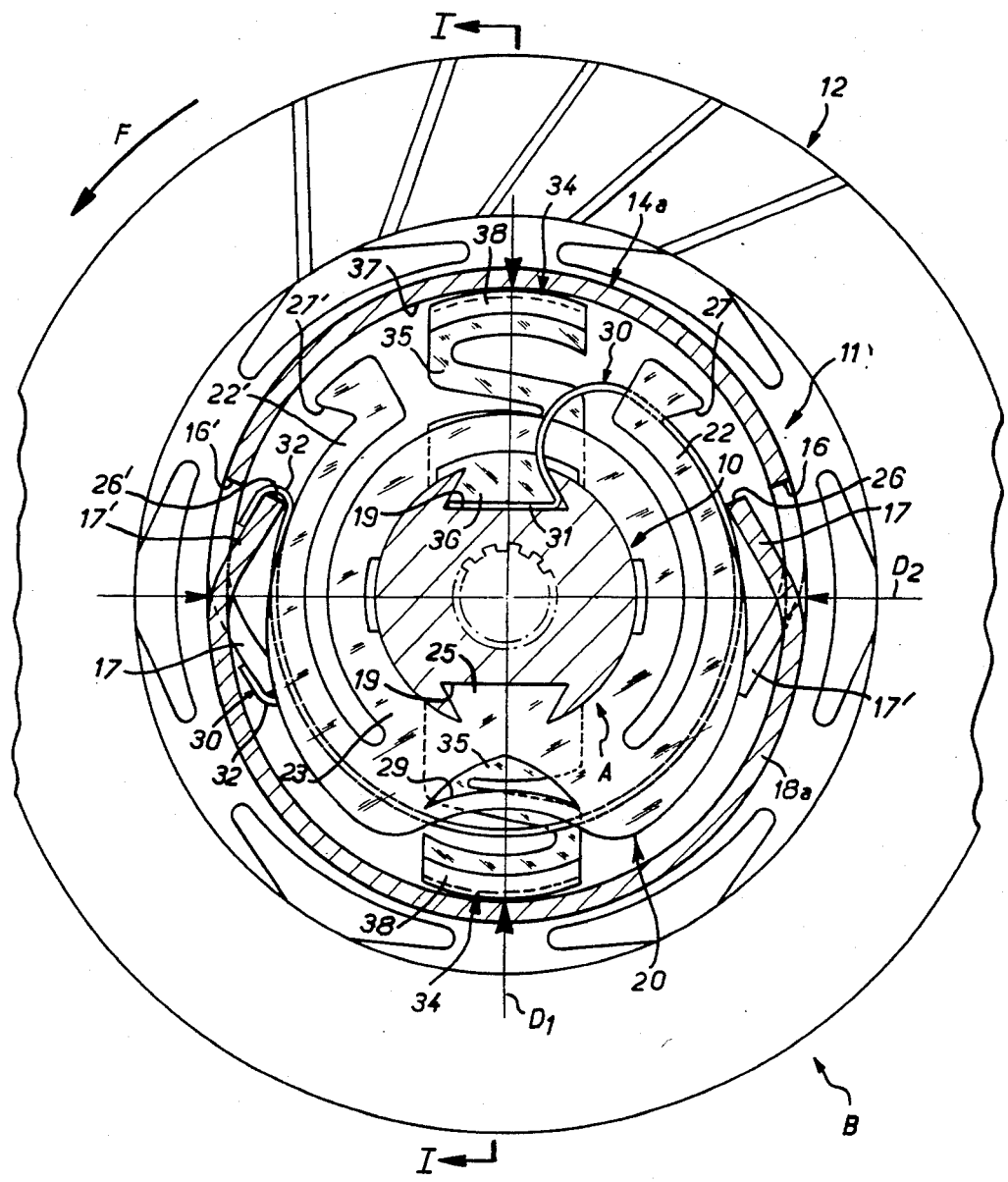
FIG. 2 is a transverse cross-section on the line II—II in FIG. 1.

In the embodiment shown this transverse cross-section is generally oval in shape, having a transverse dimension in a first direction (the vertical direction in FIG. 2) D1 which is greater than that D2 in a second direction perpendicular to the first (the horizontal direction in FIG. 2).

Thus the radius of curvature of the transverse cross-section varies angularly between two minima, at the ends of its transverse dimension D1, and two maxima, at the ends of its transverse dimension D2, its variation between said minima and maxima being regular.

In the rest configuration of the assembly, and as shown in FIG. 2, friction pads 34 are aligned with respective portions of axial surface 37 with which they cooperate of minimum radius of curvature.

Each friction pad 34 comprises a curved friction surface 38 and a support 35 therefor.

In practice, friction surface 38 is curved and its radius of curvature is less than or equal to the minimum radius of curvature of axial surface 37, for good overall adaptation thereto.

In the embodiment shown, support 35 is formed by a flange extending transversely relative to the axis of the assembly, the end thereof opposite friction surface 38 forming a foot 36 of trapezoidal profile complementary to that of axial groove 19 in hub 10.

To constrain them to rotate with hub 10, friction pads 34 are simply engaged axially, by means of foot 36 of support 35, in the corresponding axial groove 19 in hub 10.

In practice, each friction pad 34 is acted on by elastic means which urge it in the radial direction towards axial surface 37 with which it cooperates.

In accordance with the invention, these elastic means, for convenience referred to hereinafter as radially acting elastic means, form an integral part of support 36 of friction pad 34.

For example, as shown in FIGS. 1 to 4, the flange constituting support 35 comprises openings in the form of notches 41 in alternate radial edges so that it is of generally S-shaped configuration, extended in the circumferential direction (FIG. 3), whereby it constitutes the aforementioned radially acting elastic means.

Figures 5, 6:
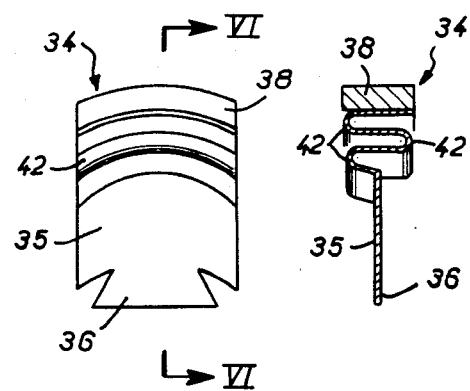
FIGS. 5 and 6 are views analogous to those of FIGS. 3 and 4, respectively, relating to an alternative embodiment.

In an alternative variant shown in FIGS. 5 and 6, the flange constituting support 35 is formed with transverse corrugations 42, whereby it constitutes the aforementioned radially acting elastic means acting on a friction pad 34.

In the rest configuration of the damper assembly, the radially acting elastic means are ineffective and friction pads 34 are merely in contact with axial surface 37 with which they are associated, without being urged resiliently against it.

When rotating part A is driven in rotation, in the direction shown by the arrow F in FIG. 2, for example, and when the torque to be transmitted from rotating part A to rotating part B is increasing, rotating part A drives rotating part B in rotation through the circumferentially acting elastic means disposed between it and rotating part B.

Initially, only that spring 30 which is attached to tang 17 of casing 11 extending circumferentially in the direction of rotation concerned is effective. Subsequently, when this tang 17 and the other tang 17 come into engagement with elastically deformable arms 22 of modular flanges 20, the latter are in turn effective, in combination with the spring 30 previously effective.

Early in the relative angular movement in the direction of arrow F between rotating part B and rotating part A friction pads 34 are ineffective.

As this relative angular movement increases, however, they are pressed more and more strongly against associated surface 37, the distance of this surface from the axis of the assembly decreasing as the relative angular movement increases.

Thus the hysteresis effect due to friction pads 34 increases with increasing relative angular movement between rotating parts A and B.

When the torque to be transmitted from rotating part A to rotating part B is decreasing, the relative angular movement between the rotating parts is reversed and a process analogous to that described above takes place, the members effective this time, through tangs 17' of shell 14a of casing 11, comprising first the other spring 30 and then elastically deformable arms 22' of modular flanges 20.

In the embodiment shown in FIGS. 1 to 4, the S-shape configuration of the flange forming the support for the friction pads and the associated radially acting elastic means may be used to generate a friction force which differs according to the direction of rotation, the S-shape opening to a greater or lesser extent.

In the embodiment shown the S-shape tends to open up for the direction of rotation corresponding to increasing torque, so that the friction force tends to increase.

The opposite arrangement may be adopted, however.

It will be understood that various changes in the details, materials and arrangements of parts, which have been herein described and illustrated in order to explain the nature of the invention, may be made by those skilled in the art within the principle and scope of the invention as expressed in the appended claims.

Specifically, the friction pads may be constrainted to rotate with the rotating part carrying the friction disk, the axial surface with which these friction pads cooperate then being formed by the external perimeter of the hub forming part of the other rotating part. This axial surface may have a transverse cross-section of a shape other than the oval shape specifically disclosed hereinabove, its radius of curvature varying between a number of maxima and/or minima.

The circumferentially acting elastic means disposed between the rotating parts may, in the usual manner, comprise elastic members such as coil springs, each housed in an opening formed partly in one of the rotating parts and partly in the other rotating part, these springs extending in a substantially tangential direction relative to a circumference of the damper assembly, as disclosed, for example, in French Pat. No. 2 411 999, filed Dec. 13, 1977 under Application No. 77 37511.

The application of the invention is not limited to the case in which the torsional damper comprises only two rotating parts, but extends to all cases in which there is a larger number of coaxial parts disposed to rotate in pairs.

Finally, the application of the invention is not limited to friction clutch plates for automotive vehicles, but extends generally to all types of torsional damper.

Also, any number of friction pads may be used. A single pad may suffice, in which case it gives rise to a radial component of friction and thus to a radial hysteresis effect, which may be of benefit in certain applications. The same applies where a number of friction pads are used, but not distributed regularly in the circumferential direction.

I claim:

1. A torsional damper suitable for use in a clutch plate of an automotive friction clutch, said torsional damper comprising at least two coaxial parts mounted to rotate relative to one another within a defined range of relative angular movement, elastic means disposed circumferentially between said coaxial parts and opposing relative angular movement of said coaxial parts, and friction means operatively disposed between said coaxial parts and including at least one friction pad which is constrained to rotate with one of said coaxial parts and is urged independently of said elastic means into frictional engagement with an axial surface constrained to rotate with the other of said coaxial parts, said axial surface being non-circular in transverse cross-section whereby frictional contact between said friction pad and said axial surface provides a hysteresis effect which varies with relative angular position of said coaxial parts.

2. A torsional damper according to claim 1, wherein said axial surface is curved in transverse cross-section, its radius of curvature varying between at least one minimum and at least one maximum.

3. A torsional damper according to claim 2, wherein, in the rest configuration of the damper, said friction pad is in line with a portion of said axial surface having a minimum radius of curvature.

4. A torsional damper according to claim 2, wherein said friction pad comprises a curved friction surface which has a radius of curvature less than or equal to the smallest radius of curvature of said axial surface.

5. A torsional damper according to claim 2, wherein said axial surface is substantially oval in transverse cross-section.

6. A torsional damper according to claim 5, wherein two of said friction pads are provided at diametrically opposed positions.

7. A torsional damper according to claim 2, wherein, in the rest configuration of the damper, said friction pad is in line with a portion of said axial surface having a minimum radius of curvature.

8. A torsional damper according to claim 2, wherein the transverse cross-section of said axial surface is substantially oval.

9. A torsional damper according to claim 1, together with other elastic means independent of the first mentioned elastic means and acting on said friction pad to urge said friction pad toward said axial surface.

10. A torsional damper according to claim 9, wherein said friction pad includes a support member including a flange having transverse corrugations defining said resilient means.

11. A torsional damper according to claim 9, wherein said other elastic means are radially acting to urge said friction pad radially against said axial surface.

12. A torsional damper according to claim 9, wherein said friction pad includes a support member and said other elastic means acts radially and comprises an integral part of said support member.

13. A torsional damper according to claim 12, wherein said support member includes a flange having transverse corrugations defining said radially acting elastic means.

14. A torsional damper according to claim 12, wherein said support member includes a flange having alternating notches in opposite generally radial edges and defining said radially acting elastic means.

15. A torsional damper according to claim 14, wherein said flange is at least partially of substantially S-shaped configuration when viewed in an axial direction.

16. A torsional damper according to claim 1, wherein said axial surface is curved in transverse cross-section, the radius of curvature of the curved transverse cross-section varying between at least one minimum and at least one maximum.

17. A torsional damper for use in a friction clutch plate, said torsional damper comprising at least two coaxial parts mounted for rotation within a defined range of relative angular movement, elastic means disposed circumferentially between said coaxial parts for opposing relative angular movement thereof, friction means operatively disposed between said coaxial parts, said friction means being independent of said elastic means and including a fricton pad constrained for rotation with one of said coaxial parts and resilient means, an axial surface constrained to rotate with the other of said coaxial parts, said axial surface being non-circular in transverse cross-section, said resilient means urging said friction pad into frictional engagement with said axial surface.

18. A torsional damper according to claim 17, wherein said resilient means urges said friction pad radially with respect to the axis of the damper.

19. A torsional damper according to claim 17, wherein said friction pad includes a support member including a flange having alternating notches in opposite generally radial edges defining said resilient means.

20. A torsional damper according to claim 19, wherein said flange is at least partially of substantially S-shaped configuration when viewed in an axial direction.

21. A torsional damper according to claim 17, wherein said torsional damper is part of a friction clutch plate, a first of said coaxial parts is fixed for rotation with a friction disc, and a second of said coaxial parts is fixed for roation with a hub.

* * * * *